(12) United States Patent
Ye

(10) Patent No.: US 12,210,607 B2
(45) Date of Patent: Jan. 28, 2025

(54) SECURITY VERIFICATION SYSTEM FEATURING USER AUTONOMY

(71) Applicant: Chunlin Ye, Zhejiang (CN)

(72) Inventor: Chunlin Ye, Zhejiang (CN)

( * ) Notice: Subject to any disclaimer, the term of this patent is extended or adjusted under 35 U.S.C. 154(b) by 214 days.

(21) Appl. No.: 17/985,711

(22) PCT Filed: Apr. 11, 2021

(86) PCT No.: PCT/CN2021/086324
§ 371 (c)(1),
(2) Date: Nov. 11, 2022

(87) PCT Pub. No.: WO2022/217375
PCT Pub. Date: Oct. 20, 2022

(65) Prior Publication Data
US 2023/0350998 A1    Nov. 2, 2023

(30) Foreign Application Priority Data

May 11, 2020   (CN) .......................... 202010392809.9

(51) Int. Cl.
*G06F 21/30*     (2013.01)
*G06F 21/32*     (2013.01)
*G06F 21/34*     (2013.01)
*G06F 21/45*     (2013.01)

(52) U.S. Cl.
CPC .............. *G06F 21/34* (2013.01); *G06F 21/32* (2013.01); *G06F 21/45* (2013.01)

(58) Field of Classification Search
CPC ........... G06F 21/34; G06F 21/32; G06F 21/45
See application file for complete search history.

(56) References Cited

FOREIGN PATENT DOCUMENTS

| CN | 111611565 A | 9/2020 | |
| WO | WO-2013117019 A1 * | 8/2013 | ............. G06F 21/30 |

OTHER PUBLICATIONS

International search report of PCT/CN2021/086324.

* cited by examiner

*Primary Examiner* — Izunna Okeke
(74) *Attorney, Agent, or Firm* — Tutunjian & Bitetto, P.C.

(57) ABSTRACT

A security verification system featuring user autonomy includes a client applied to wired and wireless communication devices and a server corresponding to the client, and contains management and control platforms at all levels and associated devices. The management and control platforms ensure the security of connection between the client and the server. The management and control platforms and the server provide different user interfaces and different application permissions according to autonomous access conditions set after authentication of the client, and take further action according to different input authorization confirmations, so as to achieve the practical effect of safely handling various situations and realize customized setting. With the simple, rational and easy-to-implement structural features, the system can ideally overcome the shortcomings of existing client applications, and can effectively and reliably ensure the security of client applications and meet different individualized needs.

4 Claims, 2 Drawing Sheets

SECURITY VERIFICATION SYSTEM FEATURING USER AUTONOMY

TECHNICAL FIELD

The present invention relates to the field of client application security, in particular to a security verification system featuring user autonomy.

BACKGROUND

With social and technological development, more and more client applications are seen in our daily life and work. While they have brought us great convenience as an inevitable trend, they may become the target of criminals for their association with money or technical data, sometimes may even cause personal safety problems. In practical use, people may have different demands for inevitable or necessary open operation and ways of confirming authorization. In the prior art, access conditions mainly include the identity information, mobile phone number, email address and password of a client, which will be fully released after access. Often, verification codes are sent to the mobile phone number or email address for confirmation, and face recognition is also adopted to enhance the security and reliability to a certain extent. However, the information will be fully released after authorization confirmation, so these access conditions are useless if top-secret or financial apps are coerced or authorization is obtained by illegal means. How to meet individual needs is also a matter to consider.

SUMMARY

The present invention aims to solve the problem of lack of security and personalization in existing client applications, and provides a security verification system featuring user autonomy with a wide application range.

To achieve the above objective, the present invention adopts the following technical scheme. A security verification system featuring user autonomy includes a client applied to wired and wireless communication devices and a server corresponding to the client, and contains management and control platforms at all levels and associated devices. The management and control platforms ensure the security of connection between the client and the server. The management and control platforms and the server provide different user interfaces and different application permissions according to autonomous access conditions set after authentication of the client, and take further action according to different input authorization confirmations, so as to achieve the practical effect of safely handling various situations and realize customized setting.

Further, verification codes can be set in a user-defined form, so as to facilitate the transmission of information according to a protocol, and deal with an emergency timely without being noticed.

Still further, the codes can be verified, a matched special USBkey structure is adopted to implement autonomous operation, and the client is separated from the selection and setting of verification codes and storage of plans, thus better ensuring security and reliability.

Specifically, the authentication mentioned above can be realized by common authentication means, or by interactive authentication involving different types of information.

Specifically, on the basis of the existing verification codes, the autonomous access conditions can reflect different situations and actual requirements for the user interface and follow-up services in real time by authorization confirmation of different sequences autonomously set up by an agreement or replacing bit codes thereof, so as to avoid the disadvantages of passive verification codes.

Specifically, providing different user interfaces is based on the premise of meeting the actual requirements of autonomous verification conditions confirmed by a client. Different permissions facilitate the setting of common use or differential treatment, and can give full play to the advantages of network resources to intelligently make corresponding judgments and treatments.

Specifically, the taking further action includes meeting the actual requirements of autonomous verification conditions confirmed by a client, so as to deal with an emergency timely by using various network resources according to the specific situation.

Specifically, the code form may be symbol marks, characters, numbers and various sound effects. The codes may be of a single class, or may contain a combination of different characters or sound effects, such that they cannot be deciphered, and even public operation can still convey real and clear requirements.

Specifically, since the matched special USBkey structure is adopted to implement autonomous operation, storage and transmission of information are facilitated and security is improved with the private and closed document structure, and tacit cooperation according to a plan or plan selection through on-spot contact is made possible.

Optionally, verified biometric information of a human body is one of the conditions for the client access and authorization of the system, and sporadic or random re-checking of different verification items during use can also be conducted to prevent cheating by people substitution.

Optionally, the system is configured to be connected in a wired or wireless manner to a monitoring and alarm system, which will be automatically triggered without being noticed once specific input information is confirmed in case of abnormal conditions.

Optionally, the system is configured to be able to save current operations with one click, and timely and intelligently switch to a preset rational page.

Clearly, the present invention adopts a rational, simple, reliable, easy-to-implement and flexible structure featuring user autonomy, and can be implemented step by step or selectively according to different application occasions. Compared with passive verification, the security of client applications can be more reliably and effectively guaranteed, which is definitely the primary goal of the present invention. Different operation interfaces, authority ranges and emergency treatments can be provided through different verification permissions, so as to meet different individualized needs, which is also a practical feature desired by the public. The open circulation and application of autonomous verification of the present invention also have the effect of deterring those who have bad intentions from wrongdoing, which is conducive to the harmonious development of the society.

The present invention has the following beneficial effects. With the simple, rational and easy-to-implement structural features, the system can ideally overcome the shortcomings of existing client applications, and can effectively and reliably ensure the security of client applications and meet different individualized needs.

DETAILED DESCRIPTION

Figure 1:
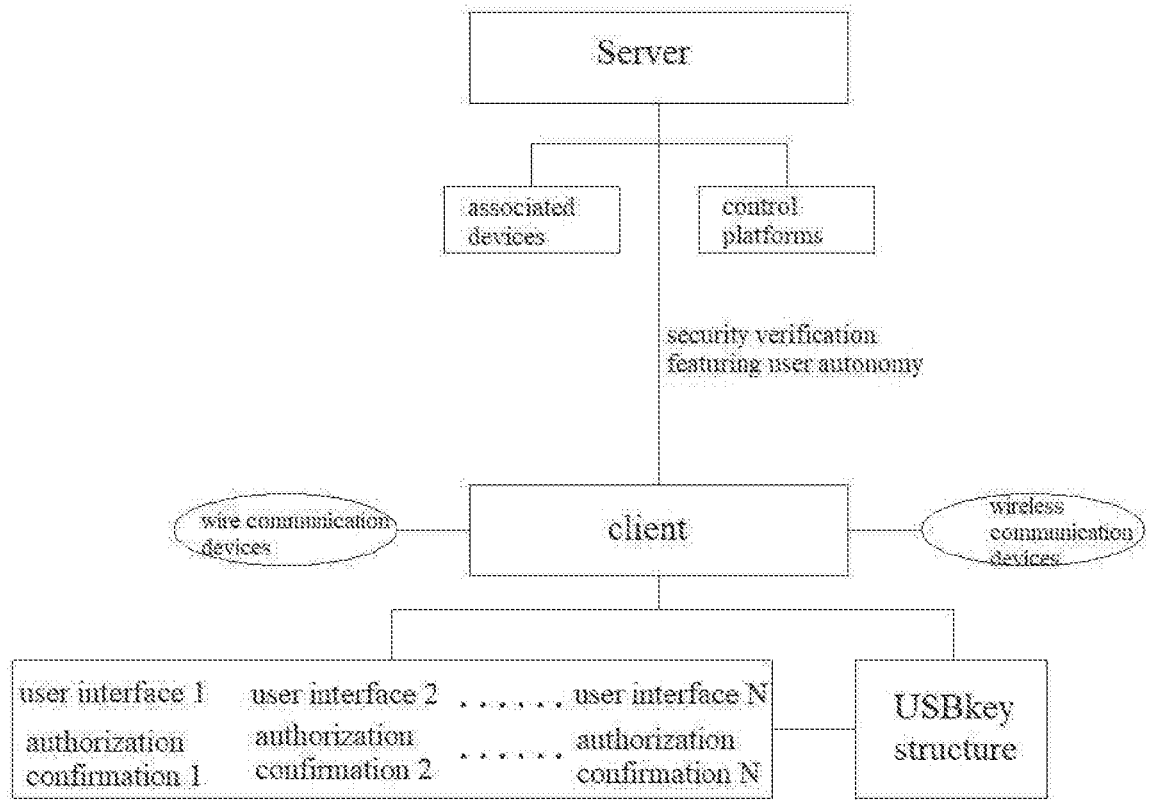
FIG. 1 is a block diagram of the security verification system according to the present invention.
Figure 2:
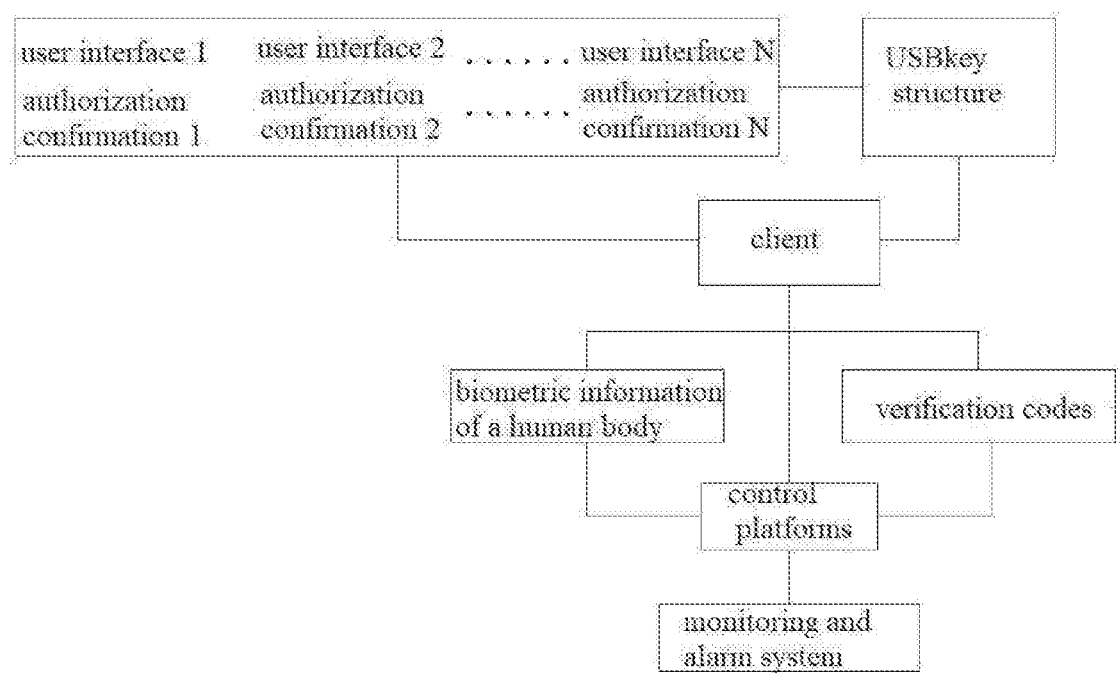
FIG. 2 is a block diagram showing of the security verification featuring user autonomy.

A security verification system featuring user autonomy is described in further detail below.

Embodiment: A security verification system featuring user autonomy includes a client applied to wired and wireless communication devices and a server corresponding to the client, and contains management and control platforms at all levels and associated devices. The management and control platforms ensure the security of connection between the client and the server. The management and control platforms and the server provide different user interfaces and different application permissions according to autonomous access conditions set after authentication of the client, and take further action according to different input authorization confirmations, so as to achieve the practical effect of safely handling various situations and realize customized setting. Further, verification codes can be set in a user-defined form, so as to facilitate the transmission of information according to a protocol, and deal with an emergency timely without being noticed.

Further, the codes can be verified, a matched special USBkey structure is adopted to implement autonomous operation, and the client is separated from the selection and setting of verification codes and storage of plans, thus better ensuring security and reliability. Specifically, the authentication mentioned above can be realized by common authentication means, or by interactive authentication involving different types of information. On the basis of the existing verification codes, the autonomous access conditions can reflect different situations and actual requirements for the user interface and follow-up services in real time by authorization confirmation of different sequences autonomously set up by an agreement or replacing bit codes thereof, so as to avoid the disadvantages of passive verification codes. Providing different user interfaces is based on the premise of meeting the actual requirements of autonomous verification conditions confirmed by a client. Different permissions facilitate the setting of common use or differential treatment, and can give full play to the advantages of network resources to intelligently make corresponding judgments and treatments. The taking further action includes meeting the actual requirements of autonomous verification conditions confirmed by a client, so as to rise to an emergency timely by using various network resources according to the specific situation. The code form may be symbol marks, characters, numbers and various sound effects. The codes may be of a single class, or may contain a combination of different characters or sound effects, such that they cannot be deciphered, and even public operation can still convey real and clear requirements. Since the matched special USBkey structure is adopted to implement autonomous operation, storage and transmission of information are facilitated and security is improved with the private and closed document structure, and tacit cooperation according to a plan or plan selection through on-spot contact is made possible. In specific implementation, verified biometric information of a human body can be used as one of the conditions for client access and authorization, and sporadic or random re-checking of different verification items during use can also be conducted to prevent cheating by people substitution. The system is configured to be connected in a wired or wireless manner to a monitoring and alarm system, which will be automatically triggered without being noticed once specific input information is confirmed in case of abnormal conditions. The system is configured to be able to save current operations with one click, and timely and intelligently switch to a preset rational page. The above are only frame statements for solving the problems of the present invention, and they can be appropriately adjusted, selected and enriched according to specific conditions in practice to better meet various needs. Obviously, those skilled in the art can make various changes to the structural arrangement of the present invention without departing from the spirit of the present invention. Therefore, if these changes fall within the scope of the claims of the present invention and their technical equivalents, the present invention is also intended to cover these changes.

The invention claimed is:

1. A autonomy-satisfied security verification system comprising a client applied to wired and wireless communication devices a server corresponding to the client, management and control platforms at all levels and associated devices,
   wherein the management and control platforms ensure of connection security between the client and the server,
   the server is configured to provide, by the management and control platforms, different user interfaces and different application permissions according to autonomous access conditions set after authentication of the client, and take further action according to different input authorization confirmations, to achieve practical effect of safely handling various situations and realize customized setting set;
   verification codes in a user-defined form to facilitate the transmission of information according to a protocol, and deal with an emergency timely without being noticed;
   the client is configured to verify the verification codes, and adopt a matched special USBkey structure to implement autonomous operation, and
   wherein the client is separated from the selection and setting of the verification codes and storage of plans.

2. The autonomy-satisfied security verification system of claim 1, wherein the autonomous access conditions comprise verified biometric information of a human for sporadic or random re-checking of different verification items during use to prevent cheating by people substitution.

3. The autonomy-satisfied security verification system of claim 1, wherein the autonomy-satisfied security verification system is configured to be connected in a wired or wireless manner to a monitoring and alarm system, wherein the monitoring and alarm system is configured to be automatically triggered based on specific input information indicating abnormal conditions.

4. The autonomy-satisfied security verification system of claim 1, wherein the autonomy-satisfied security verification system is configured to save current operations with one click, and timely and intelligently switch to a preset rational page.

* * * * *